(12) United States Patent
Kia et al.

(10) Patent No.: US 10,001,209 B2
(45) Date of Patent: *Jun. 19, 2018

(54) LINEAR EXPANSION REDUCTION OF METAL COMPONENT ASSEMBLIES USING COMPOSITES

(71) Applicant: GM Global Technology Operations LLC, Detroit, MI (US)

(72) Inventors: Hamid G. Kia, Bloomfield Hills, MI (US); Bradley A. Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/141,361

(22) Filed: Apr. 28, 2016

(65) Prior Publication Data

US 2017/0314668 A1 Nov. 2, 2017

(51) Int. Cl.
*F16H 57/032* (2012.01)
*B29C 65/48* (2006.01)
*B29C 65/56* (2006.01)
*B29L 31/30* (2006.01)
*F16H 57/02* (2012.01)

(52) U.S. Cl.
CPC .......... *F16H 57/032* (2013.01); *B29C 65/48* (2013.01); *B29C 65/56* (2013.01); *B29L 2031/3055* (2013.01); *F16H 2057/02017* (2013.01); *F16H 2057/02043* (2013.01)

(58) Field of Classification Search
CPC ..................................................... F16H 57/032
See application file for complete search history.

(56) References Cited

U.S. PATENT DOCUMENTS

| 5,485,905 | A | * | 1/1996 | Rader, III ............. B62M 11/00 192/41 A |
| 6,086,162 | A | | 7/2000 | Pinch et al. |
| 7,891,684 | B1 | | 2/2011 | Luttinen et al. |

(Continued)

FOREIGN PATENT DOCUMENTS

CN 107339325 A 11/2017
DE 102017206536 A1 11/2017

*Primary Examiner* — Daniel H Lee
(74) *Attorney, Agent, or Firm* — Harness, Dickey & Pierce, P.L.C.

(57) ABSTRACT

Methods of producing an assembly, e.g., a bearing assembly, for a vehicle, with reduced thermal expansion in a linear direction as well as methods for minimizing linear thermal expansion in an assembly, are provided. The assembly has at least two components with substantially different linear coefficients of thermal expansion (CLTEs). The assembly has a lightweight planar metal component (e.g., a housing) with a first CLTE, a second component (e.g., a bearing component) having a second CLTE, and a polymeric composite with a third CLTE. The first CLTE is greater than the second CLTE. The third CLTE is less than or equal to the second CLTE, so that the polymeric composite structure attached to the first planar metal component reduces thermal expansion of the first planar metal component in at least one linear direction and minimizes separation of the second surface of the first planar metal component from the second component.

20 Claims, 2 Drawing Sheets

(56) References Cited

U.S. PATENT DOCUMENTS

| | | |
|---|---|---|
| 8,160,774 B2 | 4/2012 | Li et al. |
| 8,708,425 B2 | 4/2014 | Carlson et al. |
| 8,776,372 B2 | 7/2014 | Krajewski et al. |
| 8,777,264 B2 | 7/2014 | Campos et al. |
| 8,980,439 B2 | 3/2015 | Carlson et al. |
| 9,278,585 B2 | 3/2016 | Rodgers et al. |
| 9,284,981 B2 * | 3/2016 | Kia ..................... F16C 33/30 |
| 9,415,628 B2 | 8/2016 | Kia et al. |
| 2010/0276047 A1 | 11/2010 | Kleber et al. |
| 2011/0084547 A1 | 4/2011 | Ehrlich et al. |
| 2014/0048988 A1 | 2/2014 | Soles et al. |
| 2017/0067186 A1 | 3/2017 | Kia |

* cited by examiner

LINEAR EXPANSION REDUCTION OF METAL COMPONENT ASSEMBLIES USING COMPOSITES

FIELD

The present disclosure relates to minimizing differential thermal expansion of lightweight metal components in at least one linear direction by using strategic incorporation of polymeric composites, for example, by incorporating polymeric composites into automotive bearing assemblies having lightweight metal components.

BACKGROUND

This section provides background information related to the present disclosure which is not necessarily prior art.

Weight reduction for fuel economy in vehicles has spurred the use of various lightweight metal components, such as aluminum and magnesium. While use of such lightweight metals serves to reduce overall weight and generally improves fuel efficiency, these metals also have relatively high linear coefficients of thermal expansion, as compared to traditional steel or ceramic materials. In component assemblies, the use of such lightweight metals can cause uneven thermal expansion under certain thermal operating conditions relative to adjacent components having lower linear coefficients of thermal expansion, like steel or ceramic materials.

For certain applications, especially in power train units and bearing assemblies, appropriate preloading and clearance within the bearing assembly maintains efficiency of performance, while uneven thermal expansion can cause spin loss and thus diminish performance and fuel efficiency. In the past, various components in bearing assemblies, including the housing and bearings themselves, were formed of similar materials like steel or ceramic, which share similar linear coefficients of thermal expansion. Thus, fluctuations in temperature during operation of the vehicle for conventional systems with materials having similar linear coefficients of thermal expansion did not result in significant volumetric changes affecting preloading or clearance in bearing assemblies or other component assemblies.

While the use of the lightweight metal components has the potential to reduce fuel economy gains attributable to weight reduction, the variability and inconsistency of bearing clearances due to the substantial differences in linear coefficients of thermal expansion can potentially result in significant spin loss and other decreased performance efficiency. In particular, automotive systems have various planar components comprising lightweight metals (having relatively high linear coefficients of thermal expansion) adjacent to other components comprising traditional materials (having lower linear coefficient of thermal expansion) thereby result in uneven linear thermal expansion of the various planar components throughout the automotive system. Thus, systems and methods for diminishing thermal expansion in at least one linear direction in automotive systems having various planar components comprising both lightweight metals and other components comprising traditional materials would be desirable to control such linear thermal expansion and further improve efficiency of operation and fuel economy.

SUMMARY

This section provides a general summary of the disclosure, and is not a comprehensive disclosure of its full scope or all of its features.

In certain aspects, the present disclosure provides methods of producing a component assembly with reduced thermal expansion in a linear direction having at least two components with substantially different linear coefficients of thermal expansion. The method may comprise forming one or more mechanical interlock features disposed along discrete discontinuous regions in a first planar metal component defining a first surface and an opposing second surface and having a first coefficient of linear thermal expansion (CLTE). The second surface of the first planar metal component is disposed in proximity with a second component having a second CLTE. The method may further comprise attaching a polymeric composite structure having a third CLTE to the first planar metal component via the one or more mechanical interlock features formed in the first planar metal component. The first CLTE is greater than the second CLTE, while the third CLTE is less than or equal to the second CLTE. The polymeric composite structure attached to the first planar metal component reduces thermal expansion of the first planar metal component in at least one linear direction and minimizes separation of the second surface of the first planar metal component from the second component.

In certain aspects, the present disclosure provides methods of minimizing thermal expansion in a linear direction of a component assembly in a vehicle having at least two components with substantially different linear coefficients of thermal expansion. The method may comprise attaching a polymeric composite structure to one or more mechanical interlock features disposed along discrete discontinuous regions formed in a first planar metal component. The first planar metal component defines a first surface and an opposing second surface. The second surface of the first planar metal component is disposed in proximity with a second component. The first planar metal component has a first CLTE, the second component has a second CLTE and the polymeric composite structure has a third CLTE. The first CLTE is greater than the second CLTE, while the third CLTE is less than or equal to the second CLTE. The polymeric composite structure attached to the first planar metal component reduces thermal expansion of the first planar metal component in at least one linear direction and minimizes separation of the second surface of the first planar metal component from the second component In other aspects, the present disclosure provides a component assembly for a vehicle having at least two components with substantially different linear coefficients of thermal expansion. The component assembly comprises a polymeric composite structure attached to one or more mechanical interlock features disposed along discrete discontinuous regions formed in a first planar metal component. The first planar metal component defines a first surface and an opposing second surface. A second component is disposed in proximity to the opposite second surface. The first planar metal component has a first coefficient of linear thermal expansion (CLTE) greater than or equal to about $20 \times 10^{-6}$/° C. The second component has a second CLTE less than or equal to about $20 \times 10^{-6}$/° C. The polymeric composite structure has a third CLTE of less than or equal to about $10 \times 10^{-6}$/° C. and a modulus of greater than or equal to about 40 GPa. The polymeric composite structure attached to the one or more mechanical interlock features disposed along discrete discontinuous regions in a first planar metal component reduces linear expansion of the first planar metal component in at least one linear direction and minimizes separation of the second surface of the first planar metal component from the second component.

In certain other aspects, the present disclosure contemplates a preloaded bearing assembly for a vehicle having at least two components with substantially different linear coefficients of thermal expansion. The preloaded bearing assembly may comprise a polymeric composite structure attached to one or more mechanical interlock features disposed along discrete discontinuous regions formed in a planar housing formed of a lightweight metal. A bearing component is disposed under static preload in proximity to a second surface of the planar housing opposite to the first surface. The planar housing has a first coefficient of linear thermal expansion (CLTE). The bearing component has a second CLTE. The polymeric composite structure has a third CLTE and a modulus of greater than or equal to about 40 GPa. The first CLTE is greater than or equal to about 25% more than the second CLTE. The third CLTE is less than or equal to the second CLTE. The polymeric composite structure attached to the planar housing reduces thermal expansion of the planar housing in at least one linear direction and minimizes separation of the second surface of the housing from the bearing component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "planar" refers to a generally two-dimensional structure, which is usually, but not necessarily, rigid and not necessarily flat.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In a vehicle, such as an automobile, an engine is a power source that produces torque for propulsion. A power transmission or power transfer unit (PTU) selectively transfers the rotating power (torque) to front and/or rear shafts or axles of the vehicle. The transmission or PTU is an assembly of parts, including speed-changing gears, shafts, and bearings that transfer power from an engine to a live axle. For example, in four-wheel drive or all-wheel drive vehicles, the transmission or PTU transfers torque to front and rear axles. Each axle receiving rotational torque transfers the torque to an associated wheel of the vehicle to propel the vehicle.

Typically, a transmission or PTU may include at least one bearing assembly, which includes an assembly housing and plurality of bearings. The plurality of bearings may be in engagement with a shaft. The bearings may be angle or tapered roller bearings, which are frequently used to support rotatable shafts or gears in transmission assemblies. Rolling bearings usually retain some internal clearance while in operation, however, in certain applications, it is desirable to provide a negative clearance keeping them under internal stress or "preloaded." Static preload for bearing can enable proper functioning to maximize durability of components by minimizing axial and radial play, spin loss, and noise under various operating conditions. A preload is usually applied to bearings in which the radial clearance can be adjusted during mounting, such as angular contact ball bearings or tapered roller bearings. Usually, two bearings (e.g., are mounted face-to-face or back-to-back to form a duplex pair of bearings) with a preload. Such bearing components may be formed of a steel alloy material or ceramic material. An outer surface of a bearing component may be adjacent to and/or in contact with the assembly housing so as to define a first interface region therebetween. An opposing inner surface of a bearing component may be adjacent to and/or in contact with the shaft to define a second interface region therebetween. The shaft may be formed of a conventional material, such as steel.

As discussed above, in certain aspects according to the present teachings, the housing assembly may be formed of a material that has a substantially different linear coefficient of thermal expansion ($\alpha$) as compared to a comparative linear coefficient of thermal expansion ($\alpha$) for the material forming the bearing interfacing with the housing at the first interface region. In certain preferred variations, the housing may be formed of a lightweight metal, such as aluminum or magnesium. In certain aspects, the present teachings are useful where there is a substantial difference or mismatch in a linear coefficient of thermal expansion ($\alpha$) (CLTE) between adjacent materials in an assembly, especially a bearing assembly for a vehicle. Such a "substantial mismatch" or difference in CLTE may be greater than or equal to about 10%, optionally greater than or equal to about 25%, optionally greater than or equal to about 50%, optionally greater than or equal to about 75%, optionally greater than or equal to about 100%, optionally greater than or equal to about 125%, optionally greater than or equal to about 150%, optionally greater than or equal to about 175%, and in certain variations is greater than or equal to about 200%. In such circumstances, a mismatch between various adjacent materials in the bearing assembly can cause differences in thermal expansion. In particular, these differences in thermal expansion can cause separation of the adjacent materials in one or more linear direction. Notably, the principles of the present disclosure may also broadly apply to other systems where materials associated with one another have significant CLTE mismatch or differences or where dimensional tolerance and preloads are important, aside from only bearing assemblies.

While the assembly structures are particularly suitable for use in components of an automobile or other vehicles (e.g., motorcycles, boats, tractors, buses, motorcycles, mobile homes, campers, and tanks), they may also be used in a variety of other industries and applications, including aerospace components, consumer goods, office equipment and furniture, construction, industrial equipment and machinery, farm equipment, or heavy machinery, by way of non-limiting example. Non-limiting examples of vehicles that can be manufactured by the current technology include automobiles, tractors, buses, motorcycles, boats, mobile homes, campers, and tanks. Other exemplary structures that have frames that can be manufactured by the current technology include buildings, such as houses, offices, sheds, warehouses, and devices.

By way of example, aluminum (Al) has a linear coefficient of thermal expansion (CLTE) of approximately $24 \times 10^{-6}/°C$. It is noted that any listed parameter or measured value described in the detailed description may vary by $\pm 10\%$. In addition, as will be appreciated by those of skill in the art, such values are generally representative but not limiting, as alloys of various metals may contain differing alloying ingredients and therefore may differ somewhat from the pure metal or base alloy measurements. Magnesium (Mg) has a representative CLTE of approximately $26 \times 10^{-6}/°C$. By comparison, steel alloys used for these applications as bearing components typically have an average CLTE of approximately $12 \times 10^{-6}/°C$ to $13 \times 10^{-6}/°C$. Thus, where the housing comprises aluminum or another lightweight metal and the corresponding surfaces of the bearing comprises a steel alloy, the difference in CLTE is at least about 85% increase from a comparative system where the housing was made from a conventional steel (rather than from the new lightweight aluminum metal). Likewise, if the housing comprises magnesium and the corresponding surface of the bearing comprises a steel alloy, the difference in CLTE is at least about a 100% increase from a comparative system where the housing was made from conventional steel. Typically, automotive systems include lightweight metal housings which have various planar surfaces and may be adjacent to other metal components comprising more traditional metals (e.g., steel). In such instances, these various planar surfaces are susceptible to expansion in one or more linear directions due to such differences in CLTE. Such differences in CLTE can cause significant issues at higher operating temperatures, especially in bearing assemblies where the amount of preloading on the bearing may be diminished by uneven expansion rates of adjacent materials in at least one linear direction, potentially resulting in spin loss and less efficient performance.

In accordance with certain aspects of the present disclosure, methods are provided of producing component assemblies which counteract and diminish the amount of thermal expansion in at least one linear direction of a higher CLTE material associated with a lower CLTE material (e.g., to assist with maintaining an amount of predetermined preload in a bearing system with CLTE mismatched materials through a range of typical operating temperatures). Such methods can advantageously allow for more stabilized bearing preloads. With regard to vehicle components, such stabilized bearing preloads can result in improved fuel economy due to a decreased drag loss in the bearings. Additionally, smaller bearings may advantageously be utilized due to the reduced effective duty cycle, which reduce mass and can further reduce drag losses. Also, more consistent and stabilized preloads can result in increased stiffness for the gears allowing for a more consistent gear pattern, which overall can result in finer meshing of the gears for a reduction in backlash and improvement in noise, vibration and harshness.

Thus, the present disclosure contemplates methods of producing a component assembly (e.g., for a vehicle) with reduced thermal expansion in a linear direction having at least two components with substantially different linear coefficients of thermal expansion. In certain variations, such a method may comprise forming one or more mechanical interlock features disposed along discrete discontinuous regions in a first planar metal component defining a first surface and an opposing second surface and having a first coefficient of linear thermal expansion (CLTE). The second surface of the first planar metal component may be disposed in proximity with a second component having a second CLTE. The method may further comprise attaching a polymeric composite structure having a third CLTE to the first planar metal component via the one or more mechanical interlock features formed in the first planar metal component, e.g., in a first surface and/or a second surface of the first planar metal component.

In other aspects, the present disclosure also contemplates methods of minimizing thermal expansion in a linear direction of a component assembly (e.g., for a vehicle) having at least two components with substantially different linear coefficients of thermal expansion. In certain variations, such a method may comprise attaching a polymeric composite structure to one or more mechanical interlock features disposed along discrete discontinuous regions formed in a first planar metal component. The first planar metal component may define a first surface and an opposing second surface. Further, the second surface of the first planar metal component may be disposed in proximity with a second component.

In various aspects, the one or more interlock features may be formed in the first surface, the second surface or both the first surface and second surface of the first planar metal component.

In various aspects, the first planar metal component described herein has a first CLTE, the second component described herein has a second CLTE and the polymeric composite structure described herein has a third CLTE.

Additionally or alternatively, the polymeric composite structure having a third CLTE may also have a modulus of greater than or equal to about 40 GPa. In certain variations, the tensile modulus of the polymeric composite material is greater than or equal to about 50 GPa, optionally greater than or equal to about 60 GPa, optionally greater than or equal to about 64 GPa, optionally greater than or equal to about 70 GPa, optionally greater than or equal to about 75 GPa, optionally greater than or equal to about 100 GPa, optionally greater than or equal to about 150 GPa, optionally greater than or equal to about 200 GPa, and in certain variations, optionally greater than or equal to about 250 GPa. Such a relatively high tensile modulus for the polymeric composite structure provides the necessary rigidity and structure to restrain linear expansion of the first planar metal component in at least one linear direction and optionally two linear directions.

In certain aspects, the first CLTE of the first planar metal component is greater than the second CLTE, optionally greater than or equal to about 25% more than the second CLTE of the second component, optionally greater than or equal to about 40%, optionally greater than or equal to about 100% or any of the values discussed above in the context of the substantially different CLTE (CLTE mismatch).

As noted above, the first CLTE differs from the second CLTE by any of the values previously listed above. In certain aspects, the first CLTE of the first planar metal component is greater than or equal to about 40% more than the second CLTE of the second component. In other aspects, the first CLTE may be greater than or equal to about 100% more than the second CLTE of the second component.

In certain variations, the polymeric composite structure may have a third CLTE of less than or equal to about $10 \times 10^{-6}/°$ C. and a modulus of greater than or equal to about 40 GPa. In certain aspects, the third CLTE is optionally less than or equal to about $8 \times 10^{-6}/°$ C., optionally less than or equal to about $6 \times 10^{-6}/°$ C., optionally less than or equal to about $4 \times 10^{-6}/°$ C., and in certain variations, optionally less than or equal to about $2 \times 10^{-6}/°$ C. The first planar metal component defines the first surface and an opposite second surface. The first planar metal component has a first CLTE greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The component assembly also comprises a second component disposed in proximity to the opposite second surface and having a second CLTE less than or equal to about $20 \times 10^{-6}/°$ C., optionally less than or equal to about $15 \times 10^{-6}/°$ C., optionally less than or equal to about $12 \times 10^{-6}/°$ C., optionally less than or equal to about $10 \times 10^{-6}/°$ C., optionally less than or equal to about $7 \times 10^{-6}/°$ C., optionally less than or equal to about $5 \times 10^{-6}/°$ C., and in certain variations, optionally less than or equal to about $4 \times 10^{-6}/°$ C. The polymeric composite structure attached to the first planar metal component reduces thermal expansion of the first metal component in at least one linear direction, optionally two linear directions, and minimizes separation of the second surface of the first planar metal component from the second component. In certain variations, the first CLTE of the first planar metal component is greater than or equal to about $20\times10^{-6}/°$ C., the second CLTE of the second component is less than or equal to about $20\times10^{-6}/°$ C., and the third CLTE of the polymeric composite material is preferably less than or equal to about $10\times10^{-6}/°$ C.

In accordance with certain aspects of the present teachings, Table 1 provides a non-limiting list of different CLTE and tensile modulus values for suitable materials that can be used in accordance with the principles of the present disclosure.

TABLE 1

| Component | Material | CLTE, $10^{-6}/°$ C. | Tensile modulus, GPa |
|---|---|---|---|
| First Planar Metal Component (e.g., housing) | Aluminum | 24 | 75 |
| | Magnesium | 26 | 45 |
| Second Component (e.g., bearing) | Steel | 12 | 200 |
| | Ceramics (alumina) | 7 | 360 |
| | Ceramics (silicon carbide) | 4 | 440 |
| Polymeric Component | KEVLAR ™ Poly-paraphenylene terephthalamide | 4 | 75 |
| | KEVLAR ™ Poly-paraphenylene terephthalamide composites unidirectional (53 wt. % in epoxy) | 8 | 64 |
| | Carbon fiber thermoset reinforced composite (axial direction) | −0.3 | 250 |
| | Carbon fiber reinforced Unidirectional (e.g., 60 wt. % loading with epoxy thermoset matrix) | 2 | 150 |
| | Glass fiber reinforced composite (e.g., type E) | 6 | 40 |
| | Glass fiber reinforced composites unidirectional (e.g., 50 wt. % loading with epoxy thermoset matrix) | 10 | 40 |

Thus, in accordance with certain methods of the present disclosure, the polymeric composite structure is attached to the first planar metal component serving to reduce thermal expansion of the first planar metal component in at least one linear direction, optionally two linear directions and minimize separation of the second surface of the first planar metal component from the second component. This is particularly advantageous where the first planar metal component and the second component having thermal mismatch, yet are desirably maintained under preloaded stress through a wide range of operating temperatures to enhance performance.

Figure 1A:
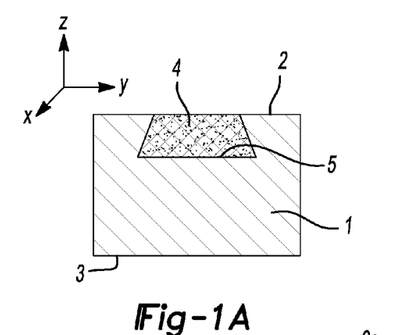
FIG. 1a shows a cross-sectional view of a polymeric composite material for reducing thermal expansion of a lightweight metal in a component assembly according to certain aspects of the present disclosure.
Figure 1B:
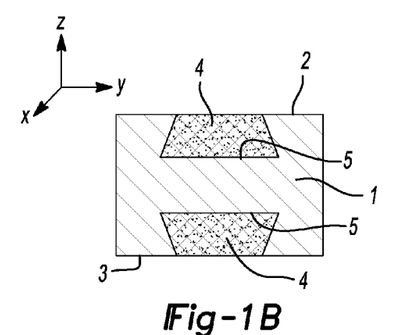
FIG. 1b shows an alternative cross-sectional view of a polymeric composite material for reducing thermal expansion of a lightweight metal in a component assembly according to certain aspects of the present disclosure.

For example, as best shown in the detailed view in FIG. 1a, a polymeric composite structure 4 attached to a housing 1 of a bearing assembly (e.g., for use in a vehicle) is provided. At least one mechanical interlock feature 5 is formed in the housing 1. The polymeric composite structure 4 is attached via the mechanical interlock feature 5. The housing 1 has a first surface 2 and an opposing second surface 3. The mechanical interlock feature 5 may be present in the first surface 2 (as shown in FIG. 1a), in the second surface 3 (not shown) or in both the first surface 2 and the second surface 3 (as shown in FIG. 1b). The second surface 3 may be in proximity with a second component (not shown). It should be noted that while there may be a gap or clearance between the second surface 3 and the second component (not shown), where the bearing assembly is under static preload, preferably contact will be established (ideally through all operating condition temperature ranges). The housing 1 can comprise a plurality of mechanical interlock features 5 that define voids on the first surface 2, the second surface 3, or both the first surface 2 and the second surface 3.

Thus, in various aspects, first surface 2 and/or second surface 3 of the housing 1 defines at least one mechanical interlock feature 5 to interact with and retain the polymeric composite structure 4.

Figure 2:
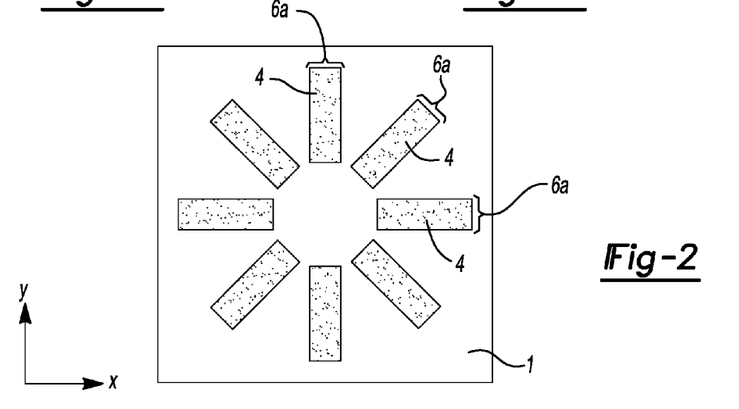
FIG. 2 shows a top view of a polymeric composite material for reducing thermal expansion of a lightweight metal in a component assembly according to certain aspects of the present disclosure.

Further, the one or more mechanical interlock features are disposed along discrete discontinuous regions in the housing 1. As illustrated in FIG. 2, the polymeric composite structure 4 is disposed along discrete, discontinuous regions 6a of the housing 1, which correspond to regions of the one or more mechanical interlock features 5. The discrete, discontinuous regions 6a may be present on the first surface 2 and/or second surface 3 of housing 1 (not shown).

Figure 3:
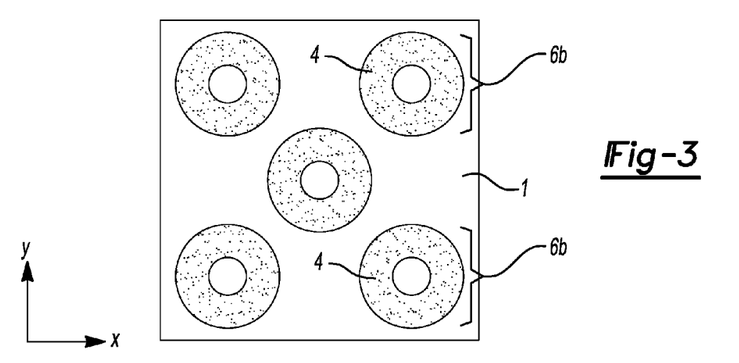
FIG. 3 shows a top view of an alternative variation of polymeric composite material for reducing thermal expansion of a lightweight metal in a component assembly according to certain aspects of the present disclosure.

The mechanical interlock feature 5 may be understood as a dovetail groove configuration for the polymeric composite structure 4 to be applied to cause the polymeric composite structure 4 to remain in contact with the housing 1; however, other mechanical interlock shapes and designs may be used for coupling the components together. For example, complementary protruding flanges, grooves, channels, locking wings of differing shapes could be used as mechanical interlock features. As shown in FIG. 2, the one or more interlock features define quadrilateral shaped regions 6a. Additionally or alternatively, as shown in FIG. 3, the one or more interlock features define toroid shaped regions 6b. Thus, in certain variations, the polymeric composite structure 4 is integrated into a dovetail groove, quadrilateral shaped region and/or a toroid shaped region on first surface 2 and/or second surface 3 of the housing 1 formed of a lightweight metal material, such that the composite and the lightweight metal will remain solidly integrated at all temperatures experienced in service.

Polymeric composite materials that form polymeric composite structure 4, like carbon-fiber reinforced polymers, have a low CLTE and a high tensile modulus as set forth above in Table 1. Lightweight metals, such as aluminum and magnesium, used to the form the housing 1 have a high CLTE and a relatively moderate tensile modulus. In particular, housing 1 is planar. As discussed above, automotive systems can include lightweight metal housings which have various planar surfaces and may be adjacent to other metal components comprising more traditional metals (e.g., steel). These various planar surfaces are susceptible to expansion in at least one linear direction, typically two linear directions, which can cause significant issues at higher operating temperatures. However, advantageously, the polymeric composite structure 4 can make it possible to cancel out the effects caused by lightweight metal housing 1 thermally expanding in at least one linear direction at a higher rate than an adjacent bearing component. Thus, the polymeric composite structure 4 can provide reinforcement and restrain expansion of the adjacent component (e.g. housing 1) to which it is attached in at least one linear direction, particularly, two linear directions, which had previously been difficult to achieve. For example, as shown in FIGS. 2 and 3, linear direction is understood herein with respect to housing 1 as a direction along the x-axis and/or the y-axis. It is understood that linear directions along the x-axis and/or the y-axis are merely exemplary and also may be diagonal or at angles to one another, etc.

As noted above, in the absence of the polymeric composite structure 4, the difference in thermal expansion between the lightweight metal and the adjacent steel or ceramic bearing causes the bearing preloads to change. Further, the polymeric composite structure 4 can be applied to numerous possible planar surfaces of lightweight metal housings and is not limited to only one portion of the housing thereby resulting in an overall dimensional stabilizing effect on the housing.

Figure 4:
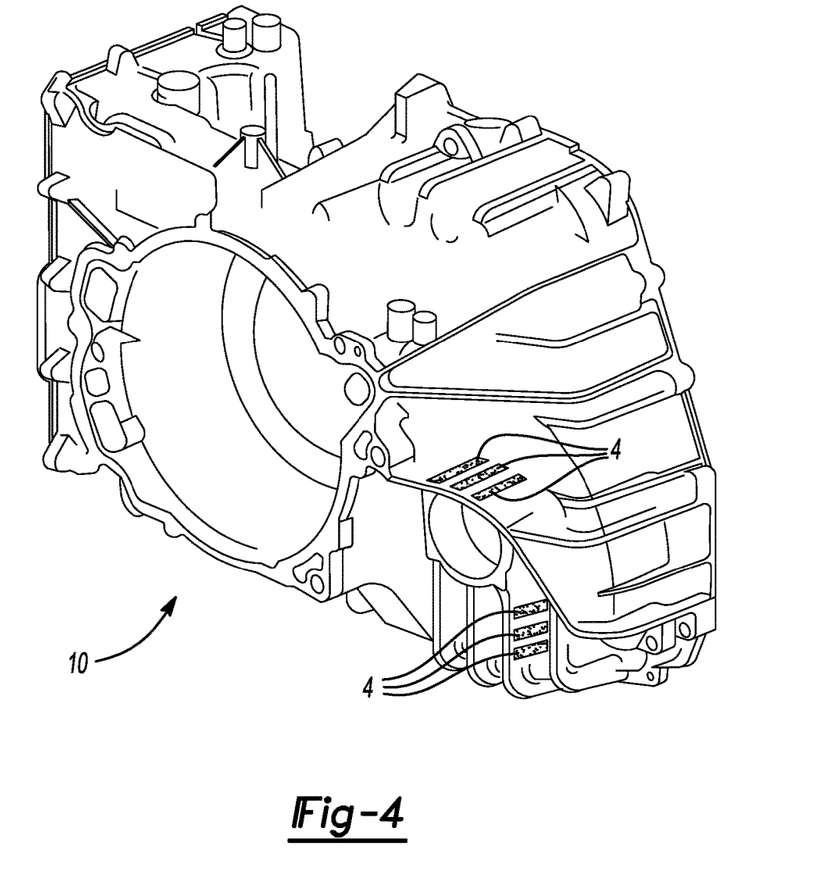
FIG. 4 shows a portion of an exemplary automotive transmission housing including a polymeric composite material for reducing thermal expansion of the transmission housing according to certain aspects of the present disclosure.

For example, it is envisioned that the concepts described herein may be suitably utilized in, but not limited to, an aluminum transmission housing for a vehicle. As shown in FIG. 4, a portion of an aluminum transmission housing 10 is provided. The polymeric composite structure 4 is attached to more than one planar portion of the transmission housing 10 via mechanical interlock features disposed along discrete discontinuous regions in the housing as described above. The mechanical interlock features may define any suitable shape as described herein.

In an alternative embodiment, the first surface and/or the second surface of the first planar metal component (e.g. housing 1) is non-circumferential. As used herein, the term "circumferential" means oriented in a direction perpendicular to a radius or parallel to a circumference. Thus, a non-circumferential shape is not oriented in a direction perpendicular to a radius or parallel to a circumference, for example, the first planar metal component (e.g. housing 1) may not be a cylindrical shape or a tubular shape. Additionally or alternatively, the non-circumferential polymeric composite structure is not in the shape of a band or ring structure disposed around a circumferential surface of the first planar metal component (e.g. housing 1), rather the part is flat or only has planar contours.

Polymeric composite materials that form polymeric composite structure 4, like carbon-fiber reinforced polymers, have a low CLTE and a high tensile modulus as set forth above in Table 1. Lightweight metals, such as aluminum and magnesium, used to the form the housing 1 have a high CLTE and a relatively moderate tensile modulus. By coupling the polymeric composite structure 4, the material properties of the composite make it possible to cancel out the effects caused by lightweight metal housing 1 thermally expanding at a higher rate than an adjacent bearing component. As noted above, in the absence of the polymeric composite structure 4, the difference in thermal expansion between the lightweight metal and the adjacent steel or ceramic bearing causes the bearing preloads to change. Yet, by introducing the polymeric composite structure 4 to the first surface 1 and/or second surface 2 of the housing 1, which may be adjacent to internal steel bearings, the polymeric composite structure 4 constrains thermal expansion.

Attaching the polymeric composite structure 4 may include applying a pre-preg composite precursor to the first surface 2 and/or second surface 3 of the housing 1 via one or more mechanical interlock features 5, followed by curing the pre-preg composite material to form the polymeric composite structure. Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. The polymeric composites (e.g., fiber-based material) may be applied in a unidirectional manner or a multidirectional manner. The alignment of the polymeric composites (e.g., fiber-based material) can determine which linear direction of the first planar metal component (e.g., housing 1) is constrained upon thermal expansion. For example, considering an x-, y-axis of a planar house, if fibers of the polymeric composite are aligned in a linear direction along an x-axis in a planar housing, the polymeric composite fibers may constrain linear thermal expansion of the planar housing along the x-axis. Similarly, if fibers of the polymeric composite are aligned in a linear direction along an y-axis in a planar housing, the polymeric composite fibers may constrain linear thermal expansion of the planar housing along the y-axis.

The fiber-based substrate material may also comprise a resin. The resin can be cured after the fiber-based material is applied to the work surface (e.g., first surface 2 and/or second surface 3 of housing 1) and thus can serve to bond single or multiple layers together in the polymeric composite structure 4.

Two methods are typically employed for introducing resin to impregnated fiber-based substrate composite material systems: wet winding (or layup) or pre-impregnating (referred to as "pre-preg"). For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency (also known as a B-stage partial cure), and then winding up the pre-preg fiber-based material for later use. Pre-preg composite material systems tend to use thermoset resin systems, which can be cured by elevated temperatures with cure times ranging from about 30 minutes to about 2 hours (depending on the cure temperatures). However, some pre-preg materials may employ resins that cure with actinic radiation (e.g., ultraviolet radiation (UV)).

In certain other aspects, the present teachings also contemplate an attaching step where a reinforcement material is applied, for example, via filament winding near, within, and/or over the one or more mechanical interlock features 5. The method may optionally comprise applying or introducing an uncured resin composition into or onto the fiber-based reinforcement material. By applying, it is meant that the uncured resin composition is wetted out onto the fiber-based material and thus may be coated on a surface of the fiber-based material or imbibed/impregnated into the reinforcement fiber-based material (for example, into the pores or openings within the reinforcement fiber-based material). After the resin is introduced to the regions having the reinforcement material, followed by curing to form the polymeric composite structure 4.

In other variations, a composite precursor material may be injection molded or otherwise applied to the first surface 2 and/or second surface 3 of the housing 1 via one or more mechanical interlock features 5, which may be followed by curing to form the polymeric composite structure 4.

In certain aspects, a thickness of the polymeric composite structure 4 is less than or equal to about 10 mm, optionally less than or equal to about 9 mm, optionally less than or equal to about 8 mm, optionally less than or equal to about 7 mm, optionally less than or equal to about 6 mm, optionally less than or equal to about 5 mm, optionally less than or equal to about 4 mm, optionally less than or equal to about 3 mm, optionally less than or equal to about 2 mm, and in certain variations, optionally less than or equal to about 1 mm.

In certain aspects, the polymeric composite structure 4 is present in the housing 1 in a weight ratio percentage of at least about 10%, optionally at least about 15%, optionally at least about 20%, optionally at least about 25%, optionally at least about 30%, optionally at least about 35%, optionally at least about 40%, or optionally at least about 45% depending on the dimensions of the housing 1. For example, the weight ratio percentage may be relative to the polymeric composite structure 4 present in a defined planar portion of the housing 1, not necessarily the entire housing 1. Alternatively, the weight ratio percentage may be relative to the polymeric composite structure present 4 in an entire housing 1. In particular, the polymeric composite structure 4 is present in the housing 1 in a weight ratio percentage of at least about 25%.

As noted above, in certain variations, the first planar metal component (e.g., housing 1) is formed of a metal selected from the group consisting of: aluminum, magnesium, and alloys thereof, which can be readily machined or die cast. The methods of the present disclosure thus also contemplate forming mechanical interlock features 5 in FIGS. 1a and 1b, by machining a surface (e.g., first surface 2 and/or second surface 3) to form the mechanical interlock feature. In such variations, the second component comprises a material selected from the group consisting of: steel, and ceramic, while the polymeric composite structure (e.g., 4) may comprise a thermoplastic resin and a plurality of reinforcing materials selected from the group consisting of: carbon, glass, and combinations thereof. In certain variations, the methods are particularly useful where the first metal component is a bearing assembly housing and the second component is a portion of a preloaded bearing component.

The present disclosure likewise contemplates an improved component assembly for a vehicle having at least two components with substantially different linear coefficients of thermal expansion. The component assembly may comprise a polymeric composite structure attached to one or more mechanical interlock features disposed along discrete discontinuous regions formed in a first planar metal component (e.g., a bearing housing). The first planar metal component may define a first surface and an opposing second surface. A second component (e.g., a bearing component) may be disposed in proximity to the opposite second surface. The first planar metal component may have a first coefficient of linear thermal expansion (CLTE) greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The second component has a second CLTE less than or equal to about $20 \times 10^{-6}/°$ C., optionally less than or equal to about $15 \times 10^{-6}/°$ C., optionally less than or equal to about $12 \times 10^{-6}/°$ C., optionally less than or equal to about $10 \times 10^{-6}/°$ C., optionally less than or equal to about $7 \times 10^{-6}/°$ C., optionally less than or equal to about $5 \times 10^{-6}/°$ C., and in certain variations, optionally less than or equal to about $4 \times 10^{-6}/°$ C. The polymeric composite structure may have a third CLTE of less than or equal to about $10 \times 10^{-6}/°$ C. and a modulus of greater than or equal to about 40 GPa. In certain aspects, the third CLTE is optionally less than or equal to about $8 \times 10^{-6}/°$ C., optionally less than or equal to about $6 \times 10^{-6}/°$ C., optionally less than or equal to about $4 \times 10^{-6}/°$ C., and in certain variations, optionally less than or equal to about $2 \times 10^{-6}/°$ C. The polymeric composite structure attached to the one or more mechanical interlock features disposed along discrete discontinuous regions in a first planar metal component reduces linear expansion of the first planar metal component in at least one direction, optionally two directions, and minimizes separation of the second surface of the first planar metal component from the second component. As noted above, in certain preferred variations, the first planar metal component comprises aluminum, magnesium, or alloys thereof, the second component comprises steel or ceramic, and the polymeric composite structure comprises a thermoplastic resin and a plurality of reinforcing materials selected from the group consisting of: carbon fibers, glass fibers, and combinations thereof.

In other aspects, the present disclosure contemplates a preloaded bearing assembly for a vehicle having at least two components with substantially different linear coefficients of thermal expansion. The preloaded bearing assembly may comprise a polymeric composite structure attached to one or more mechanical interlock features disposed along discrete discontinuous regions formed in a planar housing formed of a lightweight metal. A bearing component may be disposed under static preload in proximity to a second surface of the planar housing opposite to the first surface. The planar housing has a first coefficient of linear thermal expansion (CLTE). The bearing component has a second CLTE. The polymeric composite structure has a third CLTE and a modulus of greater than or equal to about 40 GPa. The first CLTE is greater than the second CLTE, particularly, the first CLTE is greater than or equal to about 25% more than the second CLTE, or may be any of the values previously specified above. The third CLTE is less than or equal to the second CLTE. The planar housing may have a first CLTE greater than or equal to about $20 \times 10^{-6}/°$ C., optionally greater than or equal to about $24 \times 10^{-6}/°$ C., and in certain variations, optionally greater than or equal to about $26 \times 10^{-6}/°$ C. The bearing component may have a second CLTE less than or equal to about 20×10⁻⁶/° C., optionally less than or equal to about 15×10⁻⁶/° C., optionally less than or equal to about 12×10⁻⁶/° C., optionally less than or equal to about 10×10⁻⁶/° C., optionally less than or equal to about 7×10⁻⁶/° C., optionally less than or equal to about 5×10⁻⁶/° C., and in certain variations, optionally less than or equal to about 4×10⁻⁶/° C. The polymeric composite structure may have a third CLTE of less than or equal to about 10×10⁻⁶/° C. and a modulus of greater than or equal to about 40 GPa. In certain aspects, the third CLTE is optionally less than or equal to about 8×10⁻⁶/° C., optionally less than or equal to about 6×10⁻⁶/° C., optionally less than or equal to about 4×10⁻⁶/° C., and in certain variations, optionally less than or equal to about 2×10⁻⁶/° C. The polymeric composite structure attached to the planar housing reduces thermal expansion of the planar housing in at least one linear direction, optionally two linear directions and minimizes separation of the second surface of the housing from the bearing component.

In certain aspects, the housing comprises aluminum, magnesium, or alloys thereof. The bearing component may comprise steel or ceramic. The polymeric composite structure comprises a thermoplastic resin and a plurality of reinforcing materials selected from the group consisting of: carbon fibers, glass fibers, and combinations thereof. In other variations, the bearing component is part of a tapered roller bearing assembly. In certain aspects, the bearing component is an angular contact ball bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of producing a component assembly with reduced thermal expansion in a linear direction having at least two components with substantially different linear coefficients of thermal expansion comprising:
    forming one or more mechanical interlock features disposed along discrete discontinuous regions in a first planar metal component defining a first surface and an opposing second surface and having a first coefficient of linear thermal expansion (CLTE), wherein the second surface of the first planar metal component is disposed in proximity with a second component having a second CLTE;
    attaching a polymeric composite structure having a third CLTE to the first planar metal component via the one or more mechanical interlock features formed in the first planar metal component;
    wherein the first CLTE is greater than the second CLTE, while the third CLTE is less than or equal to the second CLTE, so that the polymeric composite structure attached to the first planar metal component reduces thermal expansion of the first planar metal component in at least one linear direction and minimizes separation of the second surface of the first planar metal component from the second component.

2. The method of claim 1, wherein the polymeric composite structure has a modulus of greater than or equal to about 40 GPa and the second CLTE is greater than or equal to about 25% more than the second CLTE.

3. The method of claim 1, wherein the first CLTE is greater than or equal to about 20×10⁻⁶/° C., the second CLTE is less than or equal to about 20×10⁻⁶/° C., and the third CLTE is less than or equal to about 10×10⁻⁶/° C.

4. The method of claim 1, wherein the polymeric composite structure attached to the first planar metal component reduces thermal expansion of the first planar metal component in two linear directions.

5. The method of claim 1, wherein the one or more mechanical interlock features are formed in the first surface, the second surface, or both the first and second surface of the planar metal component.

6. The method of claim 1, wherein the one or more mechanical interlock features are formed by machining.

7. The method of claim 1, wherein the attaching comprises applying a pre-preg composite material to the one or more mechanical interlock features formed in the first planar metal component, followed by curing the pre-preg composite material to form the polymeric composite structure.

8. The method of claim 1, wherein the first surface and the second surface of the first planar metal component are non-circumferential.

9. The method of claim 1, wherein the one or more mechanical interlock features define quadrilateral shaped regions, toroid shaped regions or a combination thereof.

10. The method of claim 1, wherein the first planar metal component comprises a metal selected from the group consisting of: aluminum, magnesium, and alloys thereof, the second component comprises a material selected from the group consisting of: steel, and ceramic, and the polymeric composite structure comprises a thermoplastic resin and a plurality of reinforcing materials selected from the group consisting of: carbon fibers, glass fibers, and combinations thereof.

11. The method of claim 1, wherein the first planar metal component is a bearing assembly housing and the second component is a portion of a preloaded bearing component.

12. The method of claim 1, further comprising incorporating the component assembly into a vehicle.

13. The method of claim 1, wherein the attaching comprises applying a pre-preg composite material to the one or more mechanical interlock features formed in the first planar metal component, followed by curing the pre-preg composite material to form the polymeric composite structure.

14. The method of claim 1, wherein the first surface and the second surface of the first planar metal component are non-circumferential.

15. The method of claim 1, wherein the first planar metal component comprises a metal selected from the group consisting of: aluminum, magnesium, and alloys thereof, the second component comprises a material selected from the group consisting of: steel, and ceramic, and the polymeric composite structure comprises a thermoplastic resin and a plurality of reinforcing materials selected from the group consisting of: carbon fibers, glass fibers, and combinations thereof.

16. The method of claim 1, wherein the first planar metal component is a bearing assembly housing and the second component is a portion of a preloaded bearing component.

17. A method of minimizing thermal expansion in a linear direction of a component assembly in a vehicle having at least two components with substantially different linear coefficients of thermal expansion, the method comprising:
    attaching a polymeric composite structure to one or more mechanical interlock features disposed along discrete discontinuous regions formed in a first planar metal component, wherein the first planar metal component defines a first surface and an opposing second surface, where the second surface of the first planar metal component is disposed in proximity with a second component;

wherein the first planar metal component has a first CLTE, the second component has a second CLTE and the polymeric composite structure has a third CLTE;

wherein the first CLTE is greater than the second CLTE, while the third CLTE is less than or equal to the second CLTE, so that the polymeric composite structure attached to the first planar metal component reduces thermal expansion of the first planar metal component in at least one linear direction and minimizes separation of the second surface of the first planar metal component from the second component.

18. The method of claim 17, wherein the polymeric composite structure has a modulus of greater than or equal to about 40 GPa and the second CLTE is greater than or equal to about 25% more than the second CLTE.

19. The method of claim 17, wherein the polymeric composite structure attached to the first planar metal component reduces thermal expansion of the first planar metal component in two linear directions.

20. The method of claim 17, wherein the one or more mechanical interlock features are formed in the first surface, the second surface, or both the first and second surface of the planar metal component.

* * * * *